3,281,387
RUBBER CHEMICALS
Paul R. Wood, Naugatuck, and Joseph P. Flannery, Cheshire, Conn., assignors to United States Rubber Company, New York, N.Y., a corporation of New Jersey
No Drawing. Filed Oct. 18, 1961, Ser. No. 145,997
2 Claims. (Cl. 260—30.8)

This invention relates to rubber chemicals.

It is known that many rubber chemicals, such as accelerators, e.g., benzothiazyldisulfide, and vulcanizing agents, e.g., p-quinonedioxime and dibenzoyl-p-quinonedioxime, have a tendency to stick to the mill rolls when added to rubber as in conventional rubber compounding practice. Agglomerates and flakes of the chemical are thus formed which then resist being dispersed in the rubber. It is known that metal soaps of higher aliphatic fatty acids admixed with benzothiazyldisulfide reduce the tendency of the rubber chemical to stick to the mill rolls and improve the dispersion of the chemical in the rubber. In studying the antisticking behavior of the metal soaps of the fatty acids, it was found that the lower the melting point of the soap, the more effective it was in preventing sticking of the rubber chemical to the mill rolls. However, as the optimum antisticking performance at low melting point of the soap is reached, it was found that another undesirable factor enters. Low melting metallic soaps themselves coat the mill rolls. This coating is difficult to remove, and if not removed will affect dispersion of other ingredients into new rubber on the next batch to be milled. An effective way of removing the coating is to mill some scrap rubber and add some dry abrasive cleaner. The necessity for cleaning, however, is undesirable and favors the use of higher melting soaps which are less effective for antisticking, but do not coat the rolls themselves.

We have found a class of polyvalent metal soaps that are low melting and exhibit optimum antisticking performance towards rubber chemicals, and at the same time show no tendency to leave a coating of the soap on the mill rolls, thus making special cleaning unnecessary. The particular soaps are polyvalent metal naphthenates, such as zinc and calcium naphthenates, i.e., the zinc and calcium salts of naphthenic acids. Naphthenic acids are acidic oxygenated compounds found in petroleum (crude oil) and may be defined as monobasic carboxylic acids of the general formula R—COOH, where R is a naphthenic radical, i.e., a radical derived predominantly from cyclopentane or a homolog of cyclopentane. Commercial naphthenic acid comprises acids of the general formula

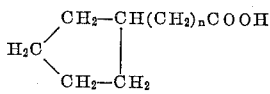

where $n$ is 1 to 5. Zinc naphthenate and calcium naphthenate are commercial products and are the zinc and calcium salts of commercial naphthenic acid. The zinc and calcium soaps of rosin acids, which have very different cyclic ring structures from naphthenic acids are not effective at all in antisticking performance.

The amount of zinc or calcium naphthenate may be from 0.5% to 5%, preferably 1% to 2%, based on the rubber chemical. Due to the gummy character of these soaps at room temperature, it is difficult to use conventional methods of mixing metallic soaps with powdered rubber chemicals as by blending the soap with the dry rubber chemical, or by grinding the soap and rubber chemical together, or by adding the soap, with or without a surface-active dispersing agent, to an aqueous slurry of the rubber chemical. An excellent method of uniformly distributing the zinc or calcium naphthenate over the powdered rubber chemical, which is equally applicable to uniformly incorporating metal soaps generally in a rubber chemical, consists in forming a water-dispersible solution of the soap in a hydrocarbon solvent such as mineral spirits, gasoline, kerosene, benzene, toluene, or mixtures thereof, containing a small amount of surface-active dispersing agent, and adding it to an aqueous slurry of the rubber chemical, which may be a plant slurry from the commercial manufacture of the chemical before filtering and drying, or which may be an aqueous slurry prepared from the dry chemical by mixing with water. Anionic, cationic or non-ionic, or mixtures of non-ionic with anionic or cationic surface-active agents may be used in conventional manner. Such anionic, non-ionic and cationic surface-active agents are well known, and those set out in the article "Synthetic Detergents and Emulsifiers" by John W. McCutcheon, in Soap and Chemical Specialties, July-October 1955, may be used. When such a water dispersible solution of the soap is added to the aqueous slurry of the rubber chemical, a fine emulsion of the solvent containing the dissolved soap results, and the fine droplets become absorbed on the particles of the rubber chemical and remain with the particles on filtering and drying. On drying, the solvent is lost and a very uniform coating of the soap on the particles of the rubber chemical results.

In preparing the mixtures of the soaps and the benzothiazyldisulfide, p-quinonedioxime, and dibenzoyl-p-quinonedioxime in the examples below, 60 parts of the various metal soaps used were dissolved in 39 parts of mineral spirits containing 1 part of a non-ionic surface-active dispersing agent (polyoxyethylene sorbitan trioleate) and this water-dispersible solution of the soap was added to an aqueous slurry of the rubber chemical in amount to give 1.5% of the soap based on the rubber chemical. The aqueous slurry of benzothiazyldisulfide was the plant product of the oxidation of the sodium salt of mercaptobenzothiazole in aqueous solution with sodium carbonate and chlorine and had a concentration of benzothiazyldisulfide of about 10%, and contained sodium chloride as a by-product of the reaction, and had a pH of about 7. The aqueous slurry of p-quinonedioxime was prepared by mixing the commercial product in water to give a concentration of p-quinonedioxime of about 10%, and had a pH of about 7. The aqueous slurry of dibenzoyl-p-quinonedioxime was the plant product of the reaction of p-quinonedioxime with benzoyl in toluene which was steam stripped to remove the toluene and left an aqueous slurry of dibenzoyl-p-quinonedioxime of about 10% concentration with a pH of about 7. The emulsified solutions of the metal soaps were absorbed on the particles of the rubber chemicals in the slurries, and the thus treated slurries were filtered, and the filter cakes dried and screened, to give the powdered rubber chemicals having intimately admixed therewith the polyvalent metal soaps.

The following examples illustrate the invention. All parts and percentages referred to herein are by weight.

3,281,387

Example 1

Eighty gram samples of powdered benzothiazyldisulfide (hereinafter sometimes called MBTS) and various metal soaps of aliphatic fatty acids and rosin acids, and zinc and calcium naphthenates, having intimately admixed therewith 1.5% of the metal soap (based on the MBTS) prepared as above described were mixed into 320 gram samples of virgin pale crepe rubber on a rubber mill to give masterbatches of about 4 parts of the rubber to 1 part of the rubber chemical. Melting points were run on the various soaps. Another 80 gram sample of straight benzothiazyldisulfide powder without soap treatment was also milled into a 320 gram sample of the pale crepe rubber. The time of incorporation of the MBTS into the rubber to the extent that the benzothiazyldisulfide powder was no longer visible in the nip of the mill was noted. This was designated as "incorporation time." This was followed by a milling period of five minutes. Observations were made during milling of back roll sticking of the MBTS, and coating of the back roll with the metal soap. After milling, the quality of the MBTS dispersion in the rubber was rated, and coating of metal soap on the front roll was noted. The coating of metal soap on the front and back mill rolls was designated as "mill roll coating of soap."

The results are shown in the following table:

| Metallic Soap | | Incorporation Time (Min.) | Back Roll Sticking of MBTS | Mill Roll Coating of Soap | Quality of Final MBTS Dispersion |
|---|---|---|---|---|---|
| Composition | Melting Point (° C.) | | | | |
| None | | 3 | Very heavy | | Very poor. |
| Calcium stearate | 148 | 3 | Some | None | Fair. |
| Calcium laurate | 83 | 1.5 | None | Heavy | Excellent. |
| Calcium octoate | (1) | 1 | do | Very heavy | Do. |
| Zinc stearate | 125 | 2 | Slight | None | Good. |
| Zinc palmitate | 103 | 1.5 | None | Heavy | Excellent. |
| Zinc oleate | 70 | 1 | do | Very heavy | Do. |
| Zinc octoate | (1) | 1 | do | do | Do. |
| Magnesium stearate | 159 | 3 | Moderate | None | Fair. |
| Magnesium palmitate | 120 | 2 | Slight | do | Good. |
| Barium stearate | 145 | 3 | Moderate | do | Fair. |
| Aluminum stearate (mono) | 160 | 3 | do | do | Do. |
| Aluminum stearate (di) | 145 | 3 | Some | do | Do. |
| Aluminum stearate (tri) | 103 | 1.5 | None | Heavy | Excellent. |
| Aluminum palmitate (mono) | 200 | 3 | Heavy | None | Poor. |
| Lithium stearate | 215 | 3 | do | do | Do. |
| Zinc rosinate | 160 | 3 | Very heavy | do | Very poor. |
| Zinc rosinate | 132 | 3 | do | Some | Do. |
| Calcium rosinate | 150 | 3 | do | None | Do. |
| Do | 90 | 3 | do | Heavy | Do. |
| Do | 63 | 3 | do | Very heavy | Do. |
| Zinc naphthenate | (1) | 1 | None | None | Excellent. |
| Calcium naphthenate | (1) | 1 | do | do | Do. |

1 Gummy at 25° C.

It may be seen from the above table that as the melting point of the polyvalent metal soaps of the aliphatic fatty acids are lowered, the back roll sticking of the MBTS is reduced but the mill roll coating of the soap is increased, and that the polyvalent metal soaps of rosin acids do not reduce the sticking of the MBTS, whereas the zinc and calcium naphthenates of the present invention eliminate the sticking of the MBTS to the mill roll, do not coat the mill roll, and give excellent dispersion of the MBTS in the rubber. Similar improvements are obtained when rubber chemicals coated with the zinc naphthenate or calcium naphthenate of the present invention are incorporated in synthetic rubbers, such as polybutadiene-1,3, polyisoprene, copolymers of major proportion of butadiene-1,3 and a minor proportion of styrene or acrylonitrile, (SBR and NBR) copolymers of 96 to 99.5 parts of isobutylene and correspondingly 4 to 0.5 part of isoprene (butyl rubber).

Example 2

One hundred gram samples of p-quinonedioxime (GMF) and dibenzoyl - p - quinonedioxime (Dibenzo GMF), and one hundred gram samples of GMF and Dibenzo GMF having intimately admixed therewith 1.5% of zinc naphthenate (based on the rubber chemical) prepared as above described were mixed with 300 gram samples of butyl rubber (copolymer of 96 to 99.5 parts of isobutylene and correspondingly 4 to 0.5 part of isoprene) to give masterbatches of about 3 parts of the rubber to 1 part of the rubber chemical. Observations similar to those of Example 1 are shown in the following table:

| Rubber Chemical | Zinc Naphthenate | Incorporation Time (Min.) | Back Roll Sticking of Rubber Chemical | Mill Roll Coating of Soap | Quality of Final Dispersion of Rubber Chemical |
|---|---|---|---|---|---|
| GMF | None | 8 | Heavy | | Poor. |
| GMF | Yes | 4 | None | None | Good. |
| Dibenzo GMF | None | 8 | Heavy | | Poor. |
| Do | Yes | 4 | None | None | Good. |

It may be seen from the above table that polyvalent metal napthenate soaps eliminate the sticking of various rubber chemicals to the mill roll, do not coat the mill roll, and improve the dispersion of the rubber chemical in the rubber.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A composition comprising a diene rubber and a powdered rubber chemical selected from the group consisting of benzothiazyldisulfide, p-quinonedioxime and dibenzoyl-p-quinonedioxime having intimately admixed therewith 0.5% to 5% by weight (based on the weight of said rubber chemical) of a polyvalent metal napthenate selected from the group consisting of zinc naphthenate and calcium naphthenate.

2. A composition comprising a diene rubber and powdered benzothiazyldisulfide having intimately admixed therewith 0.5% to 5% by weight (based on the weight of benzothiazyldisulfide) of zinc naphthenate.

References Cited by the Examiner
UNITED STATES PATENTS
2,489,704  11/1949  Davis _____ 260—785

FOREIGN PATENTS
40,874  11/1958  Romania.

OTHER REFERENCES

Compounding Ingredients for Rubber, 2nd Ed. 1947, Bill Bros. Publ. Co., p. 408.

JOSEPH L. SCHOFER, *Primary Examiner.*

LEON J. BERCOVITZ, K. B. CLARKE, F. L. DENSON, *Assistant Examiners.*